(12) United States Patent
Hill

(10) Patent No.: US 6,493,693 B1
(45) Date of Patent: Dec. 10, 2002

(54) METHOD AND SYSTEM FOR ENSURING COMPLETENESS AND QUALITY OF A MULTI-COMPONENT PROJECT

(75) Inventor: Aubrey E. Hill, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/474,022

(22) Filed: Dec. 28, 1999

(51) Int. Cl.[7] .............................................. G06F 15/18
(52) U.S. Cl. .............................. 706/46; 706/45; 706/47
(58) Field of Search ............................. 706/46, 59, 50, 706/10, 45, 47; 703/6

(56) References Cited

U.S. PATENT DOCUMENTS

| | | | | |
|---|---|---|---|---|
| 4,866,635 A | * | 9/1989 | Kahn et al. ................... | 706/46 |
| 5,406,477 A | * | 4/1995 | Harhen ........................ | 703/6 |
| 5,442,778 A | * | 8/1995 | Peters et al. .................. | 707/5 |
| 5,715,371 A | * | 2/1998 | Ahamend et al. ............. | 706/10 |
| 5,720,007 A | * | 2/1998 | Hekmapour .................. | 706/50 |
| 5,806,056 A | * | 9/1998 | Hekmapour .................. | 706/50 |
| 5,822,745 A | * | 10/1998 | Hekmapour ................. | 706/59 |
| 6,061,675 A | * | 5/2000 | Wical .......................... | 706/45 |
| 6,112,201 A | * | 8/2000 | Wical .......................... | 707/5 |

\* cited by examiner

*Primary Examiner*—Thomas Black
*Assistant Examiner*—Michael B. Holmes
(74) *Attorney, Agent, or Firm*—Shaw Pittman LLP

(57) ABSTRACT

A method for ensuring completeness and quality of a project or proposed change to a complex system including modeling the system as a plurality of nodes and storing the nodes in a database, each node being representative of a component or sub-system of the complex system, identifying relationships among the nodes, loading each node with a plurality of questions relating to the component represented by each node, and generating a listing including the questions, answers thereto and a time associated with accomplishing the proposed change or project. An apparatus for implementing the method is also described.

4 Claims, 35 Drawing Sheets

| NODE | HOURS | DESCRIPTION |
|---|---|---|
| TAXES | 0 | |
| TAXES | 0 | |
| MCC | 0 | |
| PENDING CLAIMS | 0 | |
| MEMOS | 0 | |
| INFO DATABASE | 0 | |
| ONLINE TREATMENTS | 0 | |
| REPORTS | 0 | |
| USAGE | 0 | |
| SPECIAL ASSEMBLIES | 0 | |
| MEMORY CALL | 0 | |
| Memory Call-USOC/FID | 0 | |
| AMA LOB | 0 | AMA Lines of Business |
| New Request: Impacts | 0 | |
| Usage Events from Centra | 0 | |
| Service Orders | 0 | Document used to transmit a request for service |
| Cash & Adjustments | 0 | |
| Local Usage Process | 0 | |
| Long Distance Process | 0 | |
| Service Order Process | 0 | |

FIG. 5A

| NODE | HOURS | DESCRIPTION |
|---|---|---|
| Cash Process & Balancin | 0 | |
| Accounts Database | 0 | |
| BOCRIS | 0 | Business Office Customer Records Information System; used to acce |
| Bill & Tax Calculation | 0 | |
| Bill Formatting | 0 | |
| Bill Printing | 0 | |
| Billed Data | 0 | |
| Usage Event Guides Cycl | 0 | |
| Usage Event Pages Bill C | 0 | |
| Cash Received for Posting | 0 | |
| FID | 0 | Field Identifier on Service Order |
| USOC | 0 | Uniform/Universal Service Order Code representing svc/equipment of |
| RNS | 0 | Regional Negotiation System for Residence Orders Only |
| Overture | 0 | Order issuing system for Business orders only |
| DOE | 0 | Direct Order Entry; order issuing system for Southern Bell states only |
| SONGS | 0 | Service Order NeGotiation System; order issuing system for SCB stat |
| SOCS | 0 | Service Order Communication System; collection, edit storage and di |
| SOER | 0 | Service Order Edit Routine |
| OPEC | 0 | Online Pending Edits to CRIS; edits SO agains other pending orders |
| BARS | 0 | Billing Account Reconciliation System; edits the account for billing err |

FIG. 5B

| NODE | HOURS | DESCRIPTION |
|---|---|---|
| Accounts Database | 0 | Current record of account data required for customer billing and infor |
| CRIS | 0 | Customer Records Information system; controls customer billing activi |
| CO Database | 0 | (Central Office); contains information pertaining to all NPA/NXX's in B |
| Rate database | 0 | Rate information pertaining to all USOCs and other rate affecting pro |
| Miscellaneous Input | 0 | Manual update to account on the CRIS database; entered directly int |
| Supplemental Input | 0 | Specific update activity to an account on the CRIS Database; entered |
| Parse | 0 | CRIS process which breaks down and translates the service order to |
| URECA Rating | 0 | Rates (applies charges/credits) to the service order or miscellaneous i |
| URECA Service Order U | 0 | Updates each part of the service order or miscellaneous input to CRI |
| GADB | 0 | Guide Attribute Database; guide information for all CRIS accounts; e |
| CRIS Accounts Conversio | 0 | Mass change to selected CRIS accounts at one time; involves the ad |
| Pending Service Order Co | 0 | Mass change to selected service orders that have been issued but no |
| PONs | 0 | |
| FYIs | 0 | |
| CARE | 0 | |
| Account Inquiry | 0 | |
| Account Maintenance | 0 | |
| ALPHA | 0 | |
| BAMS | 0 | |
| Bill Presentation | 0 | |

*FIG. 5C*

| NODE | HOURS | DESCRIPTION |
|---|---|---|
| BOCRIS Adjustments | 0 | |
| Calling Plans: Local/Toll | 0 | |
| General | 0 | |
| Code Administration | 0 | |
| SPOC | 0 | |
| NPA Split | 0 | |
| PARS | 0 | |
| End to End test | 0 | |
| Events from Central Office | 0 | |
| Guide Maintainence | 0 | |
| MIC | 0 | |
| Manual Entries | 0 | |
| Claims Disputes | 0 | |
| Reserve/Float % for # of | 0 | |
| Journals | 0 | |
| Revenue Director/Mechan | 0 | |
| Inv. Msg. Billing | 0 | |
| Mechanized Input | 0 | |
| Msg. Ready Msg. Switchin | 0 | |
| Flexible Invoice System | 0 | |

*FIG. 5D*

| NODE | HOURS | DESCRIPTION |
|---|---|---|
| Rate Database | 0 | |
| Rating | 0 | |
| Rating - UDD Rating | 0 | |
| Recording | 0 | |
| Recovery | 0 | |
| Refunds | 0 | |
| Reseller | 0 | |
| Switch Recording Switch | 0 | |
| Tarriff Plans | 0 | |
| Toll Plans - Toll | 0 | |
| UP (usage processing) Lo | 0 | |
| Usage Event Processing: | 0 | |
| Usage Event Processing: | 0 | |
| Usage Events from Centra | 0 | |
| Wireless | 0 | |
| BIG | 0 | Billing Information Gateway |
| GLOSSARY | 0 | Terminology/Work definitions |
| GLOSSARY | 0 | Terminology/Work definitions |

FIG. 5E

| PARENT | CHILD |
|---|---|
| PONs | ???? |
| FYIs | ???? |
| Care | ???? |
| Usage | Account Inquiry |
| Usage | Account Maintenance |
| Service Order Process | Accounts Database |
| BOCRIS | Accounts Database |
| Cash & Adjustments | Accounts Database |
| USAGE | ALPHA |
| Special Assemblies | ALPHA |
| Usage | BAMS |
| Special Assemblies | BAMS |
| Usage Event Processing | Bill & Tax Calculation |
| Accounts Database | Bill & Tax Calculation |
| Bill & Tax Calculation | Bill Formatting |
| Special Assemblies | Bill Presentation |
| Bill Formatting | Bill Printing |
| Accounts Database | BOCRIS |
| Usage | BOCRIS Adjustments |
| Special Assemblies | Calling Plans: Local/Toll |
| General | Care |
| New Requests: Impacts | Cash & Adjustments |
| Cash Received | Cash & Adjustments |
| Cash & Adjustments | Cash Process & Balancing |
| Usage | Code Administration |
| SPOC | Code Administration |
| NPA Split | Code Administration |
| Pars | End to End Test |
| Usage | Events from Central Office Switch |
| General | FYIs |
| Usage | Guide Maintenance |
| Special Assemblies | Guide Maintenance |

*FIG. 6A*

| PARENT | CHILD |
|---|---|
| MCC | INFO DATABASE |
| Usage | Local Calling Plans |
| PENDING CLAIMS | MCC |
| ONLINE TREATMENTS | MCC |
| MCC | MEMOS |
| Usage | MIC |
| MCC | ONLINE TREATMENTS |
| MCC | OVERTURE |
| Manual Entries | Pars |
| Claims Disputes | Pars |
| Reserve/Float % for # of mo | Pars |
| Journals | Pars |
| Revenue Directory/Mechanized | Pars |
| Inv. Msg. Billing | Pars |
| Mechanized Input | Pars |
| Msg. Ready Msg. Switching System | Pars |
| Flexible Invoice System | Pars |
| End to End tests | Pars |
| Claims Disputs | Pars |
| Manual Entries | Pars |
| General | PONS |
| Special Assemblies | Rate Database |
| Special Assemblies | Rating |
| Usage | Rating - UDD Rating |
| Special Assemblies | Recording |
| Usage | Recovery |
| Usage | Refunds |
| MCC | REPORTS |
| Usage | Reseller |
| MCC | RNS |
| Service Orders | Service Order Process |
| Usage | Service Orders |

*FIG. 6B*

| PARENT | CHILD |
|---|---|
| Special Assemblies | Service Orders |
| New Requests: Impacts | Service Orders |
| USAGE | Special Assemblies |
| Usage | Switch Recording Switch |
| Usage | Tarriff Plans |
| Usage | Taxes |
| Usage | Toll Plans - Toll |
| Usage | UP (Usage Processing) Local/R |
| Refunds | Usage |
| Guide Maintenance | Usage |
| Account Maintenance | Usage |
| Reseller | Usage |
| Recovery | Usage |
| UP (Usage Processing) Local/R | Usage |
| MIC | Usage |
| Rating - UDD Rating | Usage |
| Events from Central Office Switch | Usage Event Processing: Local |
| Accounts Database | Usage Event Processing: Local |
| Events from Central Office Switch | Usage Event Processing: Long |
| Accounts Database | Usage Event Processing: Long |
| New Requests: Impacts | Usage Events From Central Office |
| Usage | Wireless |

*FIG. 6C*

| QUESTION |
|---|
| 1a) What uniquely identifies this usage (ex. What Structure code, call type, models, service feature, AMAS, Pid, etc.) |
| 1) Will new service record on new or existing AMA records: |
| 1a) What uniquely identifies this usage (ex. What Structure code, call type, models, service feature, AMAS, Pid, etc.) |
| 1b) What are the billing elements? (ex. Call records on FGA record. Do we build a FGA record only, new service only, or b) |
| 1c) Are there multiple BAF records (legs) recorded for a single call event? |
| 1c1) Do we drop some legs of the call? |
| 1c1a) Need expected volumes for drops? |
| 1c1b) Need drop reason code - complete accurate drop code authorization form |
| 1c2) If so, which legs are dropped, how do we distinguish between them? (ex. AIN - drop some legs of recording) |
| 1d) New input file? |
| 1d1) ALPHA CBS department contacted? |
| 1d2) ETCs used for transmission? |
| 1d3) ETCs changes required? |
| 1d4) Will file write to tape or DASD? |
| 1d5) What is the dataset name? |
| 1d6) Where will it be created? (ex. recording from the switch) |
| 1d7) Is the new recording from a new feed? (ex. K2 Memory call) |

*FIG. 7A*

| QUESTION |
|---|
| 1d8) Provide record layout(s) including headers/trailers (ex. If BellCore layouts, use standard call types, etc.) |
| 1d9) Do all existing controls apply? (ex. missing data, duplicate data) |
| 1d10) Does this file have batch controls? |
| 1d11) Does this require GUI changes? |
| 1d12) Does this impact reports? |
| 1d13) What is the DDNAME? |
| 1d14) What is the files RBMS format? |
| 1d15) What are the physical file characteristics? |
| 1d16) Does the file need header/trailer? |
| 1d17) File has no records, should it be created? |
| 1d18) Does file have a maximum records limitation? |
| 1d19) Should this file have a UNITECH record? |
| 1d20) What APPEND Priority should this file have? |
| 1e) How should invalid recordings be handled? |
| 1e1) Are invalid recording sent to: ECS? MIC? CLUE? |
| 1e2) If yes - Network should be contacted with instructions on the error condition. |
| 1e2a) If no - ????? |

*FIG. 7B*

| QUESTION |
|---|
| 1f) Should this recording be dropped? (ex. Code installed before effective date of Tariff.) |
| f1) If yes, need reason and drop reason code. |
| 1f1a) If yes, need expected volumes for drops. |
| f1b) If yes, need complete accurate drop code authorization form. |
| 1g) What are the valid originating class of services for which this service may record? (ex. Coin, FGA, Wats, PBS, Cellular, |
| 1h) What are the valid values for informaiton contained in the recordings? (ex. call types, modules, service features, AMASI |
| 1i) Will the validity of specific information affect the validity of other information? (ex. Certain modules for specific structu |
| 1j) How should we edit the terminating number? (ex. If terminating number is 800/888, should we Generate toll free billing r |
| 1k) Are there any terminating number exceptions that should be considered? (ex. 800/888, 800555xxxx, xxx5551212. 411. 9 |
| 1l) Are there any special edits or exceptions required for the originating number? |
| 1m) For the AMA recordings that contain multiple originating numbers, which number should be passed downstream? |
| 1n) Will all switch types record the same? |
| 1o) When will the switches start to record the new AMA/Service? |
| 1p) Test AMA records need to be available for Design |
| 1p1) For best results the test data should be actual recordings from the BTAC |
| 1p1a) The BTAC will provide a large variety of recordings, including multiple terminating points such as: 800/888, 411, N |
| 1q) Is the new service expected in interwork with AIN services? |

*FIG. 7C*

| QUESTION |
| --- |
| 2) What output will be required from ALPHA? |
| 2a) New Output record? |
| 2a1) If yes, provide record layout including headers and trailers. |
| 2a2) If no, ???? |
| 2b) New output file? |
| 2b1) If empty file, should file be generated with just headers and trailers? |
| 2b2) Is there a max, record count? |
| 2b3) Should new file be added to "batch control" and "Unitech" reporting? |
| 2b4) Does new file require Run-2-Run control? |
| 2b5) Does new file require trending of output volume? |
| 2c) Output existing formats? (ex. Toll, Local, Cabs, BNS, LDC, STRAPS, RVV, AIN, etc.) |
| 2d) What type of indicators and how should they be handled? (ex. Recording method, message type, service class, origin) |
| 3e) Should unanswered calls be billed? |
| 2e1) If no, need a drop code if unanswered calls do not bill. |
| 2f) Will there be special handling needs for these recordings? (ex. SMDR, OLEC, AT&T Take Back, MATV, Study, etc.) |
| 2g) Special processing required for carrier ID? |
| 2h) Will RVV Need to be changed? |

FIG. 7D

| QUESTION |
|---|
| 2i) Will new table lookups be required? |
| 2j) How should errors in valid recordings be handled? If sent to ECS, need error code. |
| 2j1) Have Requirements been written to accommodate errors? |
| 3) Does a Tariff need to be filed? |
| 4) What is the effective date of this service? |
| 4a) Does effective date apply to message date? |
| 5) What sites are affected? |
| 6) Is this a permanent code? |
| 6a) If no, what is the date it can be removed? (NOTE: A new work request will be needed to remove code) |
| 7) What are the capacity implications? |
| 7a) How much will the input/output increase? |
| 7b) Will we need more tapes drives, CPU run time or DASD? |
| 8) Are there other projects (CPATS) that are affected by this project? |
| 9) Does this impact Office ID file? |
| 9a) Adding sensor ids? |
| 9b) Adding/Updating indicators (ex. GETS) |
| 9c) Are the changes required by a specific date? |

*FIG. 7E*

| QUESTION |
|---|
| 9c1) If yes, what are the required dates? |
| 10) Does this impact RVV? |
| 10a) Since usage is tracked at the sensor level for a message day, are any of the following items impacted? |
| 10a1) Call type, record type, hours, drop reason code, NPA-NXX, etc.) |
| Are you establishing a Billing Interface Gateway (BIG) entity code? |
| Does your item require changes in the following areas? Bill Format; Mag Tape Record; CLUB, DAB, BIG; Bulk Billing |
| FYI: Bill Format - includes CLUB & Standard Bills, OC&C, Monthly Service, and Usage; |
| Mag Tape Record - ex. a new record type or changes to existing record types, length, data fields such as charge code |
| CLUB, DAB, BIG - a new record type or changes to existing record types, etc. |
| Bulk Billing - ex. Directory Assistance, Directory Advertising, E911, etc. |
| If yes to any of the areas, contact EBS support to review the impacts to BMS & determine test requirements if applicable. |
| What change is needed to Cash and Adjustments? Is this a change to existing processes or is this new? |
| What originated the change to Cash and Adjustments? |
| What are the impacts to Cash Process and Balancing? |
| What are the impacts to Accounts Database? |
| Any impacts to Tax calculations? If yes, then how? |
| Any impacts to Bill calculations? If yes, then how? |

FIG. 7F

| QUESTION |
|---|
| Any impacts to Bill Formatting? If yes, then how? |
| Any impacts to Bill Printing? If yes, then how? |
| Which BBI Billing System(s) is/are impacted? e.g. CRIS, Quantum Applications, CABS, CMRS, BIBS |
| Date Work Request submitted for approval? |
| Type of Request: PONS, FYI, CARE, Other? |
| Are any work requests related to this request? Is this request dependent upon action from another work request? If yes: |
| What is the Customer Desired Due Date (CDDD)? (This must be a numerical date with lead time for approval and work proc work process |
| Who is the Requester? |
| What is the Requester department? |
| What is the Requester telephone number(s) with area code(s)? Do they wish to be contacted by pager? If so, what is the p |
| Who is the PCU/COU Project Lead? |
| What is the PCU/COU Project Lead Department? Telephone number(s) with area code(s)? Page Number? |
| Do you have an approved Cost Object? If no: You must have an approved cost object prior to work request submission. I |
| Who is the Billing Program Director/Sponsor for the approved Cost Object covering this work request? |
| Do you have an Item Coordinator (IC)? If no: 1) Do you have a LOB team? If yes, use your BBI rep on the LOB Team. If n |
| What is the telephone number(s) with area code(s)/pager number for the IC? |

*FIG. 7G*

| QUESTION |
|---|
| Do you have a IT Plan SME? If no: 1) Do you have a LOB team? If yes, use your IT Plan SME on the LOB Team. If no: ind |
| What is the telephone number(s) with area code(s)/pager number for the IT Plan SME? |
| Are you working with any other SMEs on this request? Do you have other contacts with whom you have worked? If so, in |
| Do you have a documented approval for this work request? If yes: the Billing Sponsor should submit documented approval |
| Approval for Work: Is this request covered by the approved Cost Object-Initiative shown in Section 3? Indicate the Cost O |
| Approval for Work: Is this to request a non-binding Time & Cost (T&C) estimate only? Indicate and ensure Billing Sponso |
| Have you determined the Business Impacts/Prioritization Criteria that must be considered? If yes, provide criteria(s) detail( |
| Is the request due to a mandate? If yes: type of mandate, order number, consequences of failing to meet mandate, who is |
| Is the request a PON? If yes: PON Information |
| Is request due to Corporate Initiatives? A dictate from EPC or Board of Directors? If yes, provide "who, what, when, where |
| Is request due to Audit Findings? |
| Is request due to Officer Priority? |
| Is request due to Other Contractual Agreements? |
| Will request generate or protect revenue? If yes, provide details, schedules, future impacts, etc. |
| Will request generate a savings for the corporation? If yes, can savings be documented? If no, are the savings in: Quality |
| Will request create a high expense reduction? If yes, provide savings details, schedules, future impacts, etc. |
| Will request help preserve Billing Integrity? If yes, provide details, impacts, etc. |

*FIG. 7H*

| QUESTION |
|---|
| Is request due to preserving Customer Satisfaction? If yes, provide "who, what, when, where and why" details. |
| Is the request for a Process Improvement? If yes, provide: "who, what, when, where and why" details and alternative solu |
| Is your Prioritization Rationale detailed? Do you have dollars defined via a schedule? Have you completely described the |
| Are there any Prioritization Special Considerations? (e.g. Date Sensitivities? Short/Long Term Impacts? Constraints/Depen |
| Provide: critical dates and descriptions, list: impacts, constraints/dependencies, define: alternatives/workarounds of Prio |
| Preliminary requirements: Are you requesting a change to a current process? If yes, describe current process |
| Preliminary requirements: Do you have any additional considerations for this request? Any alternative solutions preferenc |
| Have you developed your detailed business requirements? If yes, how many do you have? If no, detailed business requir |
| What is the acceptance criteria for each of the detailed business requirements? |
| What are the inputs for each of the detailed business requirements? |
| What are the triggers for each of the detailed business requirements? |
| What are the outputs & effects for each of the detailed business requirements? |
| What are the constraints & errors for each of the detailed business requirements (e.g. testing sites, implementation sites, d |
| What are the performance impacts (e.g. service, inc/dec of print volume, inc/dec of transaction volume, customer satisfacti |
| Are tariffs impacted by the request? If yes, how and which requirement reflects the impacts? |
| What contract/service agreements are impacted by the request? If yes, how and which requirement reflects the impacts? |
| What USOC/FID/BCSs are impacted by the request? If yes, how and which requirement reflects the impacts ? |

*FIG. 71*

| QUESTION |
|---|
| Any Service Orders/CSRs impacted by the request? If yes, how and which requirement reflects the impacts? |
| Is the Rate Database impacted by the request? If yes, how and which requirement reflects the impacts? |
| Is Usage Rate impacted by the request? If yes, how and which requirement reflects the impacts? |
| Any Usage to be Dropped/Zero-rated impacted by the request? If yes, how and which requirement reflects the impacts? |
| Any Daily Usage Files (DUF, ADUF, ODUF) impacted by the request? If yes, how and which requirement reflects the impac |
| Any ALPHA/Network Changes impacts from the request? If yes, how and which requirement reflects the impacts? |
| Is Taxing impacted by the request? If yes, how and which requirement reflects the impacts? |
| Are Settlements impacted by the request? If yes, how and which requirement reflects the impacts? |
| Are Adjustments/Treatments (Collections?) impacted by the request? If yes, how and which requirement reflects the impac |
| Any System Interfaces impacted by the request? If yes, how and which requirement reflects the impacts? |
| Is Billing Interface Gateway (BIG) impacted by the request? If yes, how and which requirement reflects the impacts? |
| Is the Input Format impacted by the request? If yes, how and which requirement reflects the impacts? |
| Any On-line Systems impacted by the request? If yes: 1) identify the systems, 2) indicate how and which requirement refle |
| Is Enhanced Billing Services impacted by the request: If yes, how and which requirement(s) reflects the impacts? |
| Is Bill Media impacted by the request? How and which requirement(s) reflects the impacts? |
| The type(s) of Bill Media: Small Bill, 8 1/2 x 11 Bill, Checkfree Bill, Customized Large User Bill (CULB), Regional Summary Bi |
| The type(s) of Bill Media: Bill Mgmt. Svce. (BMS), CRIS/CABS Billing Data Transfer (BDT), Diskette Analyzer Bill (DAB), Elect |

FIG. 7J

| QUESTION |
|---|
| The type(s) of Bill Media: Magnetic Tape (MAGTAPE) Bill, Bill Format/Presentation, Reports/Files/Stats & Studies, Conversi |
| Are your requirements clear to identify impacted IT Billing Application groups to obtain T&C estimates? |
| Constraints: Are business conditions that constrain the requirements defined? |
| Constraints: Are federal and/or state regulations that constrain the requirements defined? |
| Is each business process to be performed by system behavior defined as a requirement (e.g. switch, usage, rating, bill calc |
| Are business rules (directions for making required decisions) defined for each business function expected to be performed |
| Have online displays and processes been defined? |
| Have report requirements been defined? Have you provided an example/mockup of your report? |
| Have feeds to/from external systems been defined? |
| Error handling: have these been defined? What steps and actions are needed in case of errors/problems? |
| Do you have a need for data retention? Have you defined your need in the business requirements? |
| Have you identified performance specifications in your business requirements? e.g. Will your request affect response time |
| Do you have security, restricted access, special handling needs? Have you indicated these needs in the business requirem |
| Have you identified/defined business audit requirements? |
| Is this a new service |
| Will there be a new FID or a change to a FID? |
| Are Service Rep procedures changing? |

*FIG. 7K*

| QUESTION |
|---|
| Are there any incompatibilities with the new process? |
| Have you received Legal approval? |
| Letter printed on bill paper? If yes, are there letter variables? If yes, what are they? If yes, what are the size requirements? |
| If yes, are there letter variables? |
| If yes, what are they? |
| If yes, what are the size requirements? |
| Do you want a follow up? |
| Follow up Interval? |
| Type of Followup? Standard Types: New Followup: |
| Who handles the Followup? |
| Followup: Where and to whom is it routed? |
| What databases will the conversion affect? |
| What type conversion will be done? |
| What is the date the conversion should be completed? |
| Is the conversion Date or BP sensitive? |
| What is the criteria for account to be included in conversion? |
| Do recirculates need to be held? |

*FIG. 7L*

| QUESTION |
|---|
| *What is date to hold recirculates?* |
| *Are there datasets to be dropped in?* |
| *When should be datasets be dropped in?* |
| *Who should drop in the datasets?* |
| *When should verification be done?* |
| *What should be verified?* |
| *Is there a mock up of what conversion should look like? (before & after)* |
| *What are the sample accounts to verify?* |
| *What media should be used to do verification? e.g. Hardcopy CSRs, /For CRIS, /For SCAN, BOCRIS, etc.* |
| *How will errors be identified?* |
| *If errors fall out on RC20B10, what ID should they be under?* |
| *Who should errors be reported to?* |
| *If there are problems with verification, who should be notified?* |
| *Will extracts be needed before or after conversion?* |
| *What are extract criteria? (always must include NPA/NSSx)* |
| *Which type extract needed? (RQ40B23 or RG57B95)* |
| *What is the date the extract should run?* |

*FIG. 7M*

| QUESTION |
|---|
| What should be done with the extract? |
| What is the date for the conversion to be done? |
| FYI: Information to be provided to the Svce. Order Group for Svce. Order Verification. |
| Have examples of the old service order format been provided? Have examples of the new service order format been provid |
| Have sample accounts been provided? |
| Are errors expected? If so, what kind and why? |
| If errors are expected, can something be done to prevent them? |
| Who should errors or problems be reported to during the implementation period? (Provide name, work number, beeper nu |
| FYI: The following questions decide whether or not a Pending Service Order conversion is needed. If yes is answered to a |
| CONTINGENCY: Pending Service Order conversion must be done with the database conversion; it causes hold file errors |
| Is the USOC of FID being stripped from the database, converted to another USOC or FID, or format changed? |
| Is the USOC of FID currently being used? |
| Are the reps still using the USOC or FID on service orders? |
| Service Orders? |
| CSR? |
| Product? |
| FIDs? |

FIG. 7N

| QUESTION |
|---|
| USOCs? |
| BCSs? |
| Account Codes? |
| Phrase Codes-Adjustments? |
| Phrase Codes-OCC? |
| Revenue Tracking? |
| Filed Interstate? |
| Filed Intrastate |
| SIG? |
| Termination liability? |
| Billing Guarantee? |
| Installation Charges? |
| Service Order Cancellation Charges? |
| Credit Outages? |
| SAWs? |
| Ratcheting? |
| Database Conversion? |

FIG. 70

| QUESTION |
|---|
| Revised Reports? |
| New Reports? |
| OCC Bill Verification? |
| Holdfile Errors? |
| COPE Errors? |
| End-to-End Test? |
| What generated the request: Usage Events from Central Office Switches, Service Orders, Cash & adjustments? |
| Does the change involve creating a new NPA/NXX? |
| What changes or additions will be needed to the CRIS Rate database? |
| What changes will be involved to Usage/Toll billing? |
| What activity is requested: alter an existing activity, create new activity? |
| What will request affect? e.g. Process, Screen, etc.? |
| Effect to accounts: |
| Effect to Central Office activity: |
| Effect to BOCRIS: |
| Impacts to Tax calculations: |
| Impacts to Bill calculations: |

FIG. 7P

| QUESTION |
|---|
| Impacts to Bill Formatting: |
| Impacts to Bill Printing: |
| Is this request for a new service? |
| FID activity and impact: |
| Service Rep procedures change? |
| Process incompatibilities which require additional edits (e.g. SOER, OPEC, etc.): |
| Impacted issuing systems and effect: (e.g. RNS, Overture, DOE, SONG, etc.) |
| Does the new FID require a change to the BOCRIS screen? Can the information be entered online using a current BOCRIS |
| Is there an allowance for BBI to manually update the FID on the Accounts database? |
| Is this USOC or FID being converted on CRIS accounts? |
| What is the appropriate NPA/TAR code for this service? |
| What are the appropriate Tax Exempt indicatiors for this customer (at least GAC and State)? |
| What is the appropriate account code for this service? |
| Local Usage Process? |
| Long Distance Process? |
| Any impacts to the bill cycle? If yes, then |
| Any impacts to Bill Calculation? If yes, then |

FIG. 7Q

| QUESTION |
|---|
| Any impacts to Tax Calculation? If yes, then |
| Any impacts to Bill Formatting? If yes, then |
| Any impacts to Bill Printing? If yes, then |

FIG. 7R

Big rele.txt

```
****************************************************
```
BIG RELEASE  : ONE_TIME  1/26/99  1:49:15 PM

2 HOURS

```
****************************************************
```
BIG RELEASE  : ONE_TIME  1/26/99  1:49:16 PM

How will ONE TIME be changed?

Not Answered

```
****************************************************
```
BIG RELEASE  : RECURRING  1/26/99  1:49:21 PM

11 HOURS

```
****************************************************
```
BIG  RELEASE  : RECURRING  1/26/99  1:49:23 PM

Will RECURRING CHARGES be affected?

Not Answered

```
****************************************************
```
BIG RELEASE  : SERVICE_ORDERS  1/26/99  1:49:28 PM

3 HOURS

```
****************************************************
```
BIG RELEASE  : SERVICE_ORDERS  1/26/99  1:49:30 PM

What is the desired due date of the service order?

Not Answered

```
****************************************************
```
BIG  RELEASE  : SERVICE_ORDERS  1/26/99  1:49:31 PM

Should recurring charges be fractionalized on service order genaration ?

Not Answered

FIG. 8A

Big rele.txt

```
************************************************************
```
BIG RELEASE : SERVICE_ORDERS  1/26/99  1:49:32 PM

Will OCCs be necessary for the fractions?

Not Answered

```
************************************************************
```
BIG RELEASE : SERVICE_ORDERS  1/26/99  1:49:33 PM

Should recurring charge/initial period be pro-rated?

Not Answered

```
************************************************************
```
BIG RELEASE : SERVICE_ORDERS  1/26/99  1:49:34 PM

Is there a service order charge?

Not Answered

```
************************************************************
```
BIG RELEASE : BIG RELEASE  1/26/99  1:48:14 PM

Please describe your request.

```
************************************************************
```
BIG RELEASE : RATING  1/26/99  1:48:29 PM

10 HOURS

```
************************************************************
```
BIG RELEASE : RATING  1/26/99  1:48:31 PM

What is rating?

Not Answered

```
************************************************************
```
BIG RELEASE : RATING  1/26/99  1:48:32 PM

What is the calculation for rating?

Not Answered

*FIG. 8B*

Big rele.txt

*********************************************************
BIG RELEASE : MSG_RATING  1/26/99  1:48:40 PM

4 HOURS

*********************************************************
BIG RELEASE : MSG_RATING  1/26/99  1:48:41 PM

How will rating of calls through TOPS be affected?

Not Answered

*********************************************************
BIG RELEASE : FLAT_RATE  1/26/99  1:48:46 PM

5 HOURS

*********************************************************
BIG RELEASE : FLAT_RATE  1/26/99  1:48:47 PM

Will we still offer FLAT RATE?

Not Answered

*********************************************************
BIG RELEASE : BOC  1/26/99  1:48:51 PM

7 HOURS

*********************************************************
BIG RELEASE : BOC  1/26/99  1:48:52 PM

Will the BOC be affected?

Not Answered

*********************************************************
BIG RELEASE : LOCAL  1/26/99  1:48:56 PM

9 HOURS

FIG. 8C

Big rele.txt

```
************************************************************
```
BIG RELEASE  : LOCAL   1/26/99  1:48:58  PM

How will LOCAL change?

Not Answered

```
************************************************************
```
BIG RELEASE  : BULK_RATE   1/26/99  1:49:03  PM

15 HOURS

```
************************************************************
```
BIG RELEASE  : BULK_RATE   1/26/99  1:49:04  PM

What about BULK RATE?

Not Answered

```
************************************************************
```
BIG RELEASE  : SERVICE_RATING   1/26/99  1:49:10  PM

15 HOURS

```
************************************************************
```
BIG RELEASE  : SERVICE_RATING   1/26/99  1:49:11  PM

How will service rating be affected?

Not Answered

```
************************************************************
***************
```
TOTAL HOURS REQUIRED FOR THIS PROJECT:

METHOD AND SYSTEM FOR ENSURING COMPLETENESS AND QUALITY OF A MULTI-COMPONENT PROJECT

BACKGROUND

FIELD OF THE INVENTION

The present invention relates generally to computer systems, and more particularly to computer systems that ensure completeness and quality of a project.

BACKGROUND OF THE INVENTION

The human memory is imperfect. Most people are unable to remember everything they have learned. And, even if a particular person has an especially good memory, he may nevertheless be unable to quickly and to accurately retrieve all relevant information related to a particular project. In view of the foregoing, people often rely on various devices to help retain and retrieve knowledge. For example, a baker uses recipes to help him bake a variety of bread, cookies, and cakes. Each recipe contains a list of ingredients and a set of baking procedures. By using these recipes, the baker can be sure that he will not leave out an ingredient or overcook the food, thereby producing baked goods of consistent quality.

A more sophisticated example of a memory assistance device is a checklist typically used by automobile insurance claim specialists. There are many types of vehicles in the market today, and each type of vehicle has different models and each model has thousands of parts. Relying on memory alone, it would be virtually impossible for a claim specialist to provide a reasonably accurate "parts and labor" estimate for a particular vehicle model. Thus, the claim specialist needs a checklist that contains, among other things, a list of parts which require replacement, parts costs, and time periods to install those parts. With the checklist, even a relatively inexperienced claim specialist can provide a reasonably accurate parts and labor estimate.

While a recipe is helpful to a baker and a checklist to an insurance claims specialist, such devices are inadequate for ensuring completeness and quality of a more complex project that requires involvement of many people of different skills. For example, the above-described memory devices are inadequate to assist an automobile manufacturer who relies on a team of mechanical engineers, electronics engineers, designers, metallurgists, materials scientists, psychologists, marketers and lawyers, to design and build an automobile that performs as desired, sells, and meets regulatory requirements. It is clearly impossible for the automobile manufacturer to rely on human memories alone to determine how, for example, changes made to the fuel system of an automobile might affect the exhaust system, the emission system, and the ignition system of that automobile. This "memory" problem is exacerbated since it is not uncommon for skilled employees to leave the company thereby losing individual and institutional knowledge.

Consider a very simple scenario in which the automobile manufacturer plans to redesign the fuel system of one of its automobile models. The automobile manufacturer needs to know what factors must be considered and how many hours will be required to redesign the fuel system for that particular automobile model. The first group of people the automobile manufacturer likely consults for implementing the redesign is the fuel system engineers group. In addition to providing the time estimate and factors to consider, the fuel system engineers group, under ideal circumstances, notifies the automobile manufacturer that it (the manufacturer) should also consult engineers from the emission, exhaust, ignition, and power output groups because changes made to a fuel system typically require redesigning these other systems as well. The automobile manufacturer preferably then consults the other engineering groups as suggested. If each engineer of each team properly remembers both the necessary actions and the time required to implement those actions to redesign each system, the automobile manufacturer will obtain a reasonably accurate project description and time estimate. But the reality is that one or more "key" engineers may no longer be with the company, or those with the company may provide inaccurate descriptions of "necessary actions" or time estimates thereby leading to poor project management plans. Further, one or more of the engineers might employ in work descriptions acronyms and ambiguous words, making it difficult for the automobile manufacturer to accurately predict the true scope of a proposed design change.

Another example of a complex system where a change to one component might require changes to other components is a complex billing system, and more particularly, a computerized billing system of a telephone company. As mobile telephone systems, data lines and other services provided by the telephone company have become more common, billing individual customers for such services has become increasingly complex and requires hundreds of programmers and managers to ensure efficient and accurate billing.

Existing software products, such as CBR Express, available from Inference Corporation of Novato, Calif., which are directed primarily to individual case retrieval do not provide the aforementioned functionality as they are not designed to enumerate and analyze all combinations or permutations of all potential impacts of a project.

There are also other products that are related to document version management, such as DOORS , available from Quality Systems & Software of Mt. Arlington, N.J. These products assign version numbers, e.g., "1.0" to a first document and when subsequent changes are made to that document, the version is automatically updated to "1.1," "1.2," etc., along with annotations and dates with respect to who made the changes and why. However, such products also are unable to accomplish the tasks enumerated above.

Also known are "expert systems." These systems typically are designed as either rule-based or case-based. With either type, however, it is necessary to program all of the rules and/or all of the possible case scenarios that might be encountered. Unfortunately, it is not always clear, at a given time, what changes or modifications to a system might be effected at a future time, thereby defeating the usefulness of both types of systems. Moreover, these systems require extensive programming and maintenance.

SUMMARY OF THE INVENTION

The Requirements Expert of the present invention fills the need for an experienced, meticulous, and detail-oriented analyst. The Requirements Expert is a dynamic, flexible tool, which uses a knowledge base that is created by one or more users. The Requirements Expert gains additional knowledge each time it is used. The Requirements Expert helps its user to determine what the scope or requirements are for a particular project. It also gives its user an estimate of time required to complete the project. The Requirements Expert further ensures that its user considers every factor associated with that project by systematically asking the user a series of questions.

In a preferred embodiment, the Requirements Expert ("R.E.") is implemented in a computer system which has a central processing unit ("CPU"), a memory and input (e.g., keyboard) and output (e.g., monitor and/or printer) systems. The computer system is programmed with a relational database and algorithm which facilitates entry, manipulation and retrieval of information from the database. The database can be implemented in any general purpose relational database application such as MICROSOFT ACCESS™ and the algorithm can be written in any suitable application such as VISUAL BASIC™. The information stored in the database is knowledge regarding a particular project or complex system. The complex system preferably is represented as a logical model consisting of nodes and links where each node represents a particular component of the system and the links connecting the nodes represent relationships between any two nodes. Each node, i.e., system component, is further supplied with a list of questions pertaining to that node and information with respect to how that node might affect other nodes. The output of the Requirements Expert preferably is used to provide a listing or printed document of the analysis performed by the Requirements Expert.

Before using the Requirements Expert, a user preferably first provides the Requirements Expert with information about each system component and how changes to each component might impact other components. This information preferably is entered in the form of questions to be directed to a user. Once the nodes and links are defined, and at least some questions for each node are stored in the database, the Requirements Expert is ready for use. When the algorithm is executed, the Requirements Expert queries the user to identify which of the nodes is to be considered to analyze a particular project. Upon obtaining the response, the Requirements Expert asks the questions associated with that node, and provides the user with other relevant information about that node, such as how long it might take to accomplish a proposed change. The Requirements Expert also asks questions, or presents queries, associated with related effected nodes, consistent with the logical model represented in the database. The Requirements Expert also records, or stores, responses to the questions along with definitions for any detected acronyms or ambiguous words. Finally, the Requirements Expert provides the user with a document listing the questions, answers to the questions, and, as available, a listing of recommended actions to be taken to accomplish the proposed change. Other relevant information, such as the time associated with accomplishing the proposed change is also provided, as available.

Thus, in the preferred embodiment of the present invention the Requirements Expert has the following characteristics or objectives:

1. It helps its user to retain and retrieve knowledge.
2. It ensures that the user considers every detail of a project or complex system.
3. It assists a company in retaining its institutional expertise even when key employees leave the company.
4. It describes to the user the nature of each component as that component is encountered.
5. It informs the user how one component or portion of the complex system impacts other components or portions.
6. It queries the user with a series of questions about each component or portion of the system and records answers to those questions.
7. It detects acronyms and requires the user to provide a definition for each acronym detected.
8. It detects ambiguous words and requires the user to replace each ambiguous word with a more definite term or phrase.
9. It provides a time estimate for performing the project.
10. It provides an output document, free of ambiguous words and undefined acronyms, that lists each impacted component, list of questions and answers to the questions about each component, and an estimate of the time required to complete the project.

The Requirements Expert is also unique in that its emphasis is on requirements acquisition, not only requirements management. That is, the Requirements Expert of the present invention assists the user to develop new action or project plans, including accurate projected time for carrying out those plans. This is different from conventional requirements management where a system or person is responsible for ensuring that predetermined requirements are met.

BRIEF DESCRIPTION OF THE DRAWINGS

FIGS. 5A–5B illustrate an exemplary listing of nodes representing the various components of a complex billing system.

FIGS. 6A–6B illustrate an exemplary listing of relationships between nodes illustrated in FIGS. 5A–5B.

FIGS. 7A–7E depict an exemplary listing of questions associated with selected nodes.

FIGS. 8A–8E depict a partial example of an output of the present invention including questions and time periods.

DETAILED DESCRIPTION OF THE INVENTION

The present invention, the Requirements Expert, is a computer system that ensures completeness and quality of a project.

Figure 1:
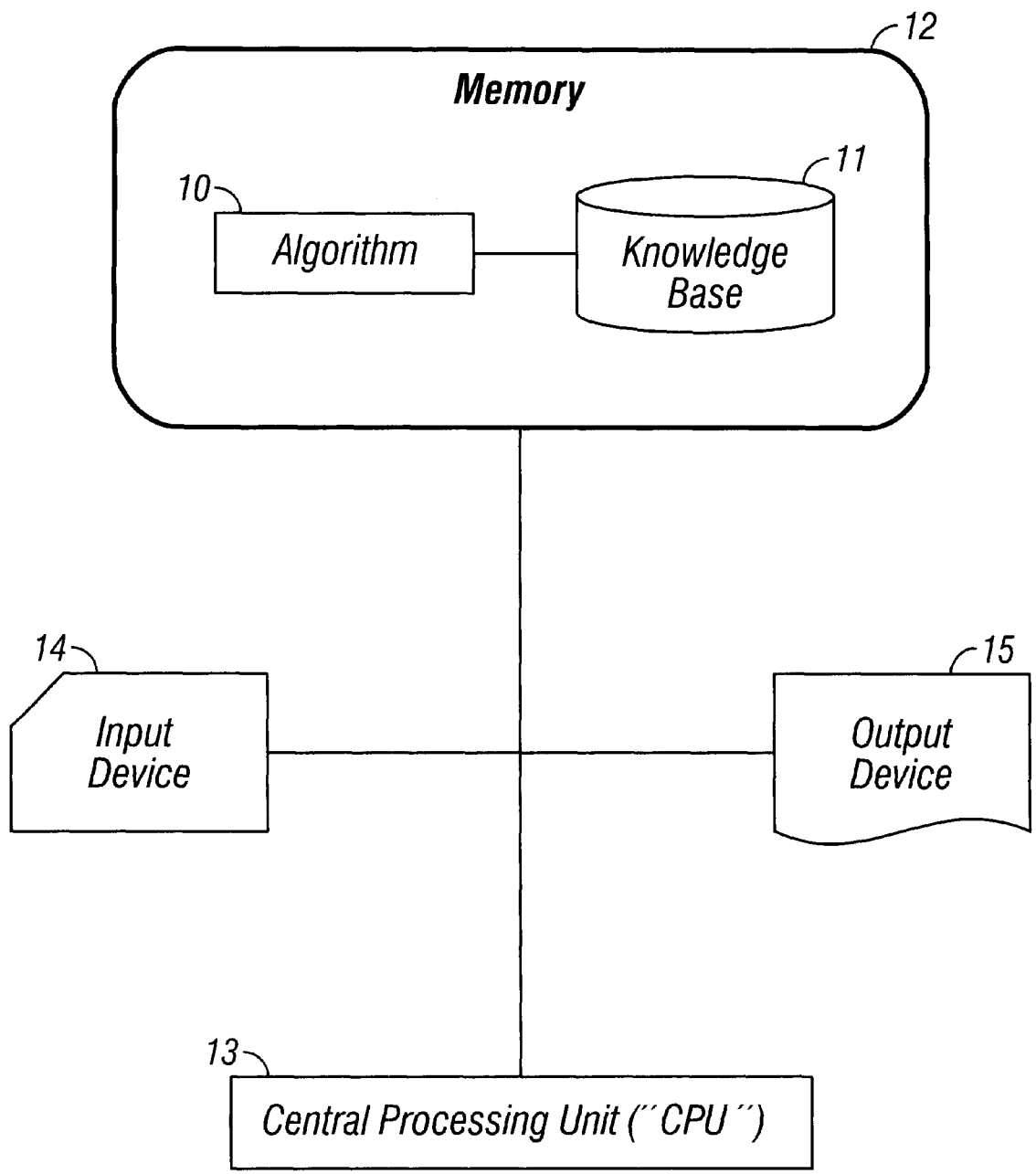
FIG. 1 is a schematic diagram illustrating the various elements of the Requirements Expert of the present invention.

FIG. 1 is a schematic diagram illustrating the various elements of the Requirements Expert ("R.E.") of the present invention. As shown in FIG. 1, the R.E. has an algorithm 10 and a knowledge base 11 stored in a memory 12, a central processing unit ("CPU") 13, an input device 14, and an output device 15. Input device 14 (such as a keyboard) and output device 15 (such as a monitor or a printer) are in communication with CPU 13 as in conventional computer systems. Memory 12, within which algorithm 10 and knowledge base 11 reside, is also in communication with CPU 13.

Knowledge base 11 preferably is manually constructed by human experts such as engineers, scientists, marketers and other experts. Execution of algorithm 10 prompts a user to update knowledge base 11, and any information stored in knowledge base 11 is retrievable by algorithm 10. In the preferred embodiment, algorithm 10 is written in the VISUAL BASIC™ programming language and knowledge base 11 is implemented in a relational database such as MICROSOFT ACCESS™. Of course, any other suitable application for algorithm 10 or knowledge base 11 is considered within the scope of the present invention. For example, an ORACLE™ relational database may be utilized to construct knowledge base 11.

Knowledge base 11 is initially empty. Then, a logical model of a complex system is created in knowledge base 11 through the execution of algorithm 10 by using input device 14. Conceptually, the logical model is a network of nodes and links in which nodes represent domain items, i.e., components of the complex system, and links represent node-to-node impacts, i.e., relationships between nodes or system components. As the user continues to use the Requirements Expert, the user incrementally builds knowledge base 11, and the Requirements Expert becomes more useful to the user over time.

Figure 2:
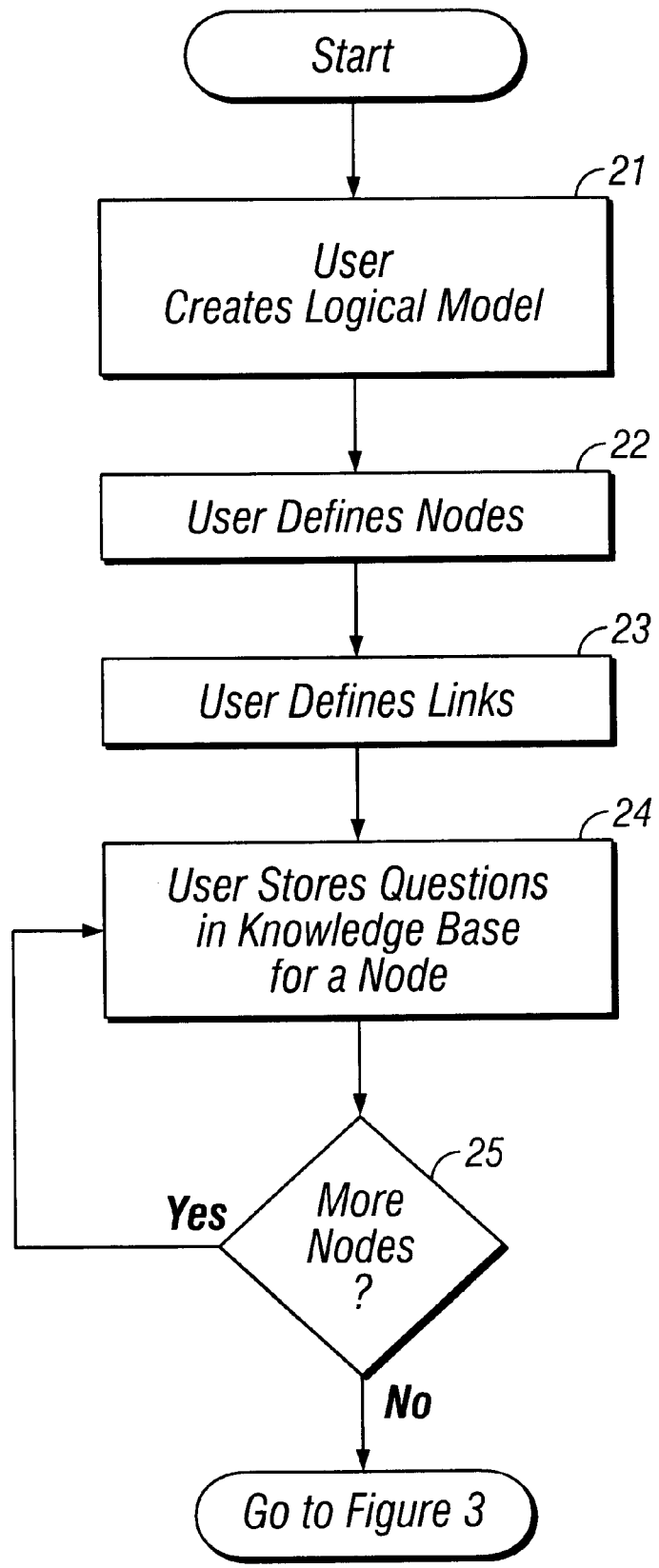
FIG. 2 is a flowchart illustrating the steps required to provide initial knowledge to the Requirements Expert.
Figure 2A:
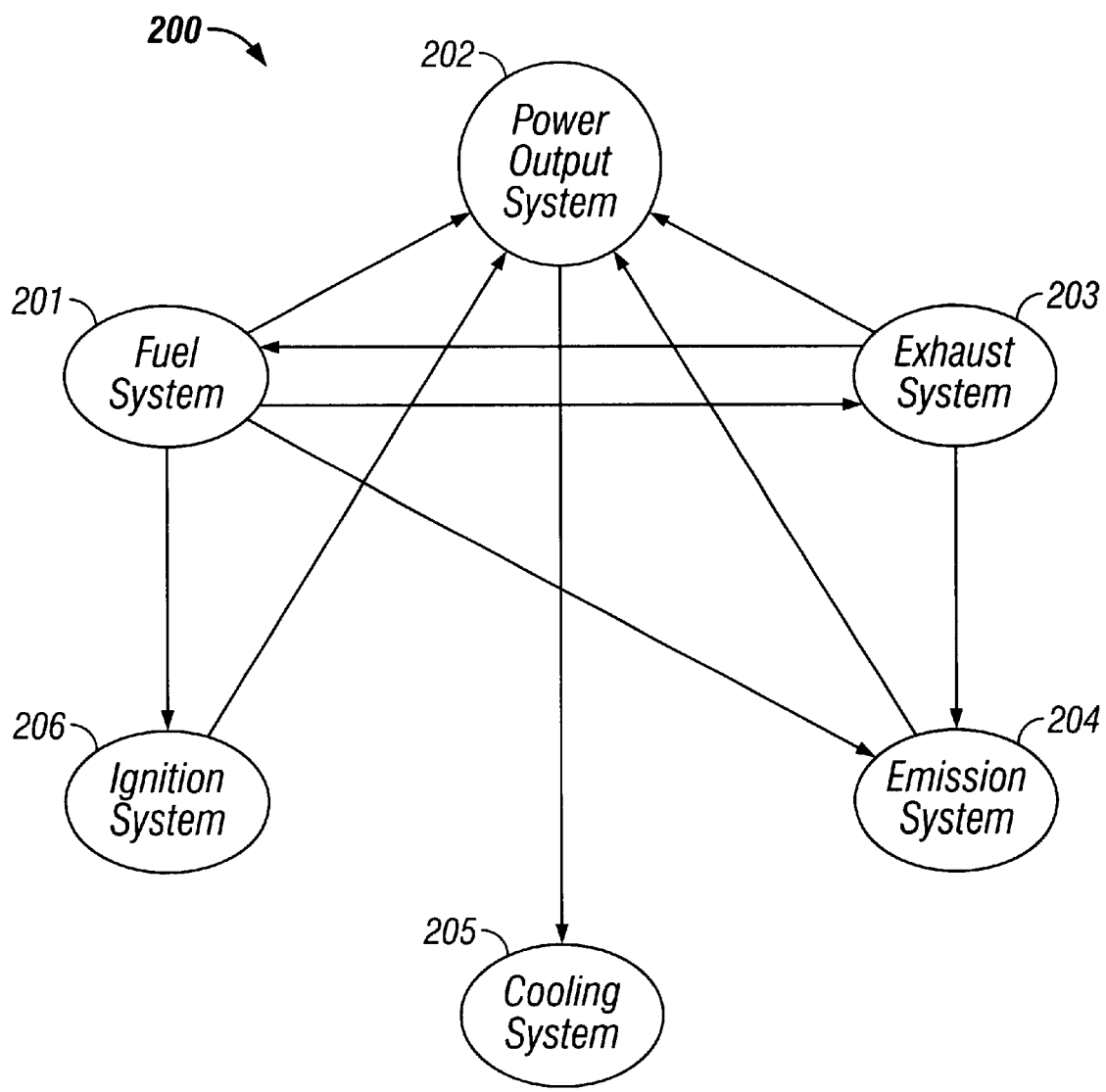
FIG. 2A is a schematic diagram of an example of the present invention, representing a model of how various systems of an automobile relate to each other.

FIG. 2 is a flowchart illustrating the preferred steps to provide initial knowledge to the Requirements Expert. In step 21, a Requirements Expert user creates a logical model for a complex system. FIG. 2A is a schematic diagram of an example of a logical model 200 illustrating how various components or systems of an automobile relate to each other. Consider a scenario in which an automobile manufacturer has a car model that has been in production. The automobile manufacturer thereafter decides to incorporate new features in the car, and the automobile manufacturer needs to know what actions and/or how much time are/is required to redesign the car.

As shown in FIG. 2A, logical model 200 represents the following components: a fuel system 201, a power output system 202, an exhaust system 203, an emission system 204, a cooling system 205, and an ignition system 206. The arrows connecting the various systems represent the "parent-child" relationships or links among the various systems. For example, changes to fuel system 201 affect power output system 202, exhaust system 203, emission system 204, and ignition system 206. However, changes to fuel system 201 do not affect cooling system 205. Thus, each of the systems or components of the overall complex system is considered a "node," and each arrow represents a "link."

Referring back to FIG. 2, we now consider the automobile manufacturer's project as an example to describe the remaining steps in FIG. 2. The automobile manufacturer, in step 22, defines each node by creating a table in knowledge base 11. Table 1 is an example of node definitions for the automobile project summarizing the names of the various components, a brief description for each component, and how many hours are required to redesign various aspects of each component.

TABLE 1

Nodes Definition

| Node (Component) | Brief Description | Hours Required |
|---|---|---|
| Cooling System | Radiator, Hoses, Fan | 60 |
| Emission System | PCV, Catalytic Converter | 50 |
| Exhaust System | Headers, Mufflers | 30 |
| Fuel System | Carburetor, Fuel Injection | 20 |
| Ignition System | Capacitor Discharge, Spark Plugs | 40 |
| Power Output System | Horse Power | 10 |

In step 23, the automobile manufacturer defines each link consistent with logical model 200 (shown in FIG. 2A). Each link connects a "parent" node to a "child" node. The parent-child relationship is one in which changes made to a parent node tends to cause a recommended modification to a child node. Table 2 (which is stored in knowledge base 11) represents all the parent-child relationships in the automobile example.

TABLE 2

Parent-Child Relationships

| Parent | Child |
|---|---|
| Cooling System | None |
| Emission System | Power Output System |
| Exhaust System | Fuel System |
| Exhaust System | Power Output System |
| Fuel System | Emission System |
| Fuel System | Exhaust System |
| Fuel System | Ignition System |
| Fuel System | Power Output System |
| Ignition System | Power Output System |
| Power Output System | Cooling System |

As mentioned above, a link between any two nodes is a parent-child relationship. Once all parent-child relationships have been defined in knowledge base 11, the Requirements Expert is ready to assist the user in making changes to a complex system.

In step 24, the automobile manufacturer supplies knowledge base 11 with a list of questions for each node of model 200. By repeating steps 24 and 25, Tables 3A through 3F are created in knowledge base 11.

TABLE 3A

Questions for the "Cooling System"

Questions for the Cooling System

Is this an air-cooled or a water-cooled system?
What is the capacity of the cooling system?
Etc.

TABLE 3B

Questions for the "Emission System"

Questions for the Emission System

What is the state emission standard?
Is a catalytic converter used?
Etc.

TABLE 3C

Questions for the "Exhaust System"

Questions for the Exhaust System

What is the expected exhaust flow volume in terms of cubic feet per second?
Etc.

TABLE 3D

Questions for the "Fuel System"

Questions for the Fuel System

Does the system use a carburetor?
What is the required fuel flow in terms of cubic feet per second?
Etc.

TABLE 3E

Questions for the "Ignition System"

Questions for the Ignition System

How much voltage is required?
Etc.

TABLE 3F

Questions for the "Power Output System"

Questions for the Power Output System

What is the desired power output?
Etc.

Figure 3:
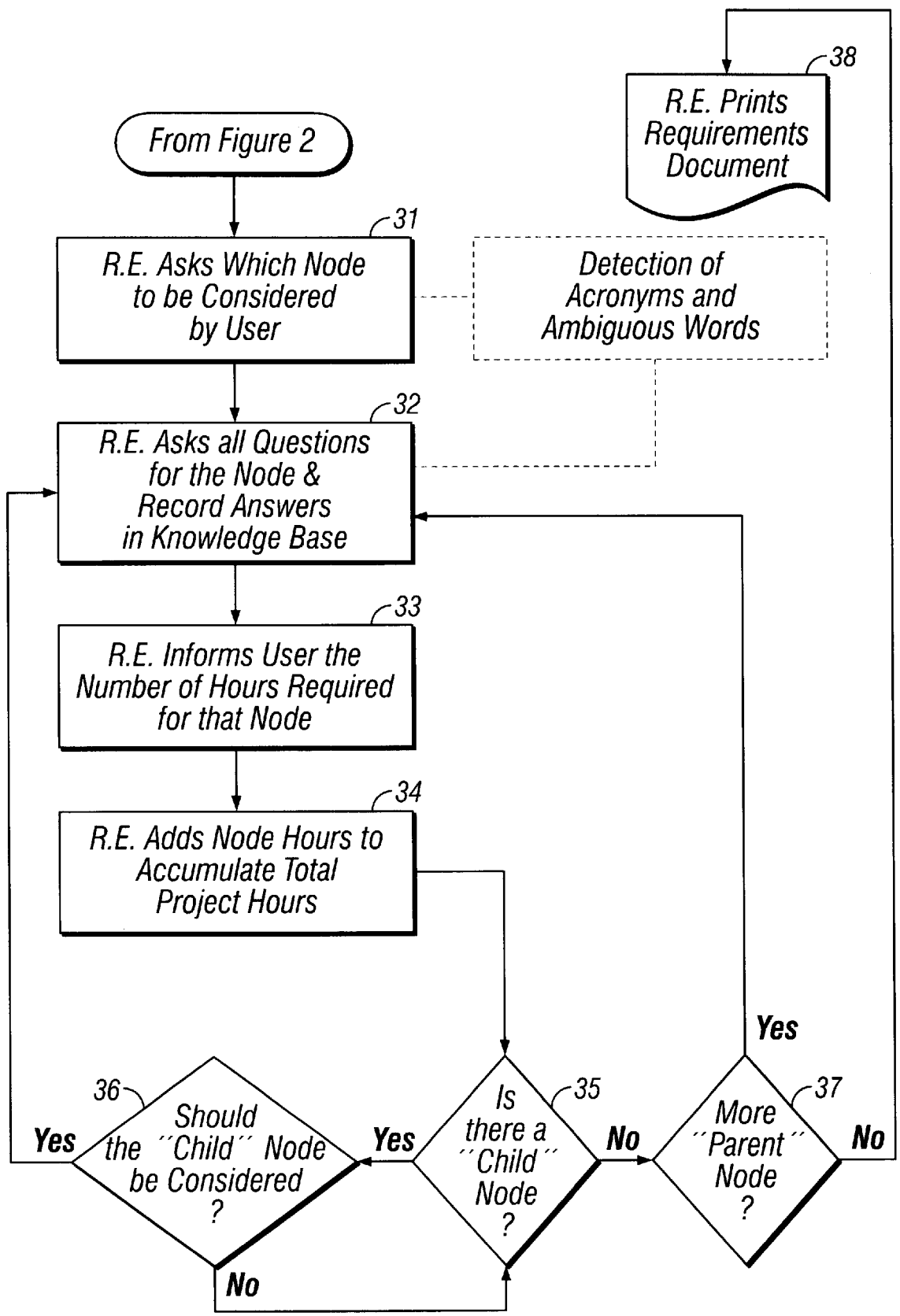
FIG. 3 is a flowchart illustrating the steps required to use the Requirements Expert after it has been provided with initial knowledge.

FIG. 3 is a flowchart illustrating the preferred steps for using the Requirements Expert (abbreviated as "R.E." in FIG. 3) after it has been provided with initial knowledge as described above. For example, when the automobile manufacturer executes algorithm 10, the Requirements Expert, in step 31, queries the user, that is, asks the user to identify which of the six sub-systems or components (nodes) is to be considered for implementing a project, i.e., effecting a change to the overall system. Suppose the automobile manufacturer wants to have an estimate of how long it might take to redesign the fuel system. The automobile manufacturer would provide "Fuel System" as a response. Upon encountering the input "Fuel System," the Requirements Expert searches Table 1 and finds fuel system 201 in model 200. The Requirements Expert then informs the user that the "Fuel System" relates to carburetor and fuel injection, as described in Table 1. The Requirements Expert then proceeds to step 32 and asks the questions listed in Table 3D, which are associated with the fuel system node. The purpose of these queries is to ensure that the user is aware of every detail associated with fuel system 201 and every way in which changes to fuel system 201 might impact other systems. Also in step 32, the Requirements Expert records the answers received. When the Requirements Expert has recorded the answers, it informs the user, in step 33, that it takes 20 hours to redesign fuel system 201 as shown in Table 1. In step 34, the Requirements Expert adds the 20 hours to the project total.

The Requirements Expert then checks Table 2, in step 35, and determines that emission system 204 is a child node of fuel system 201. In step 36, the Requirements Expert asks the user whether to consider the questions associated with emission system 204. If the answer is "Yes," the Requirements Expert repeats steps 32 through 34 and asks all the questions in Table 3B, and adds the 50 hours from emission system 204 to the project total resulting in a new total of 70 hours. Summing is performed by a summing circuit (not shown). If the user considers every child node associated with fuel system 201, the project total would be 150 hours (20 hours from fuel system 201, 50 hours from emission system 202, 30 hours from exhaust system 203, 40 hours from ignition system 205, and 10 hours from power system 206). As shown in FIG. 3, the user has the option of bypassing any of the child nodes in step 36.

In step 37, the Requirements Expert asks the user whether the user wishes to consider another parent node. For example, the user may also want to redesign cooling system 205, in which case the process will repeat steps 32 through 37 and the new project total will be 210 hours (150 plus 60 from cooling system 205). The Requirements Expert preferably then prints, in step 38, a document that includes the questions and answers, and the total hours required for the project.

Again, as shown in FIG. 3, it is possible for the user to bypass any child node to streamline the process, especially if a particular child node has already been identified via a different parent node. Further, as is evident from all of the foregoing, the Requirements Expert of the present invention keeps both a listing of recommended actions and a running total of time for completing those actions. Accordingly, the Requirements Expert provides an especially useful tool for project planners and managers.

In the preferred embodiment, the Requirements Expert also detects acronyms and ambiguous words in steps 31 and 32. When the Requirements Expert encounters an acronym for the first time, it asks the user, via a query engine, what the acronym stands for, and keeps that definition in knowledge base 11. For example, if the user had supplied the acronym "EFI" in one of the responses, the Requirements Expert checks an acronym list in knowledge base 11 to determine whether "EFI" has a definition. If it does not, the Requirements Expert asks the user to supply a definition, e.g., "electronic fuel injection," and adds the definition to the acronym list. As another example, the automobile manufacturer may define the acronym "HP" as "horse power." Table 4, stored in knowledge base 11, is an example of an acronym list.

TABLE 4

List of Acronyms

| Acronym | Meaning |
| --- | --- |
| EFI | Electronic Fuel Injection |
| HP | Horse Power |

The second time the Requirements Expert encounters the term "HP," it looks up Table 4 and asks the user, "Does HP mean Horse Power?" If it does, the process continues with the next process step. Otherwise, the user supplies the second meaning, e.g., "HEWLETT-PACKARD™," and the Requirements Expert updates Table 4 to become Table 4a below:

TABLE 4a

Updated List of Acronyms

| Acronym | Meaning |
| --- | --- |
| EFI | Electronic Fuel Injection |
| HP | Horse Power, HEWLETT-PACKARD ™ |

When the Requirements Expert encounters the term "HP" for a third time, it asks the user, "There are two meanings for HP. Which do you mean, Horse Power or HEWLETT-PACKARD™?" If there is yet a third definition for HP, then the Requirements Expert allows the user to input the third definition so that the next time the user inputs "HP" the Requirements Expert queries the user to choose from a list of three possible meanings associated with "HP."

Similarly, if the user provides an ambiguous word that is listed on the Requirements Expert's list of ambiguous words, it prompts the user to provide the proper meaning of the ambiguous word. Table 5 is an example of a list of ambiguous words.

TABLE 5

List of Ambiguous Words

| Ambiguous Words | Proper Meaning |
| --- | --- |
| High Pressure | Greater than 50 pounds per square inch |
| Hot | At least 130° C. |

In view of the potential for a great number of nodes that might require consideration for a given project, the Requirements Expert preferably also includes a means of remembering the state of a user's interaction with the Requirements Expert and returning the user to that state following an interruption, either intentional or accidental, of the user's Requirements Expert session. The means for remembering may be implemented with an automatic periodic saving of a session including the questions and answers to the questions that have already been entered. The in-progress information may be saved to a disk or network.

Figure 4:
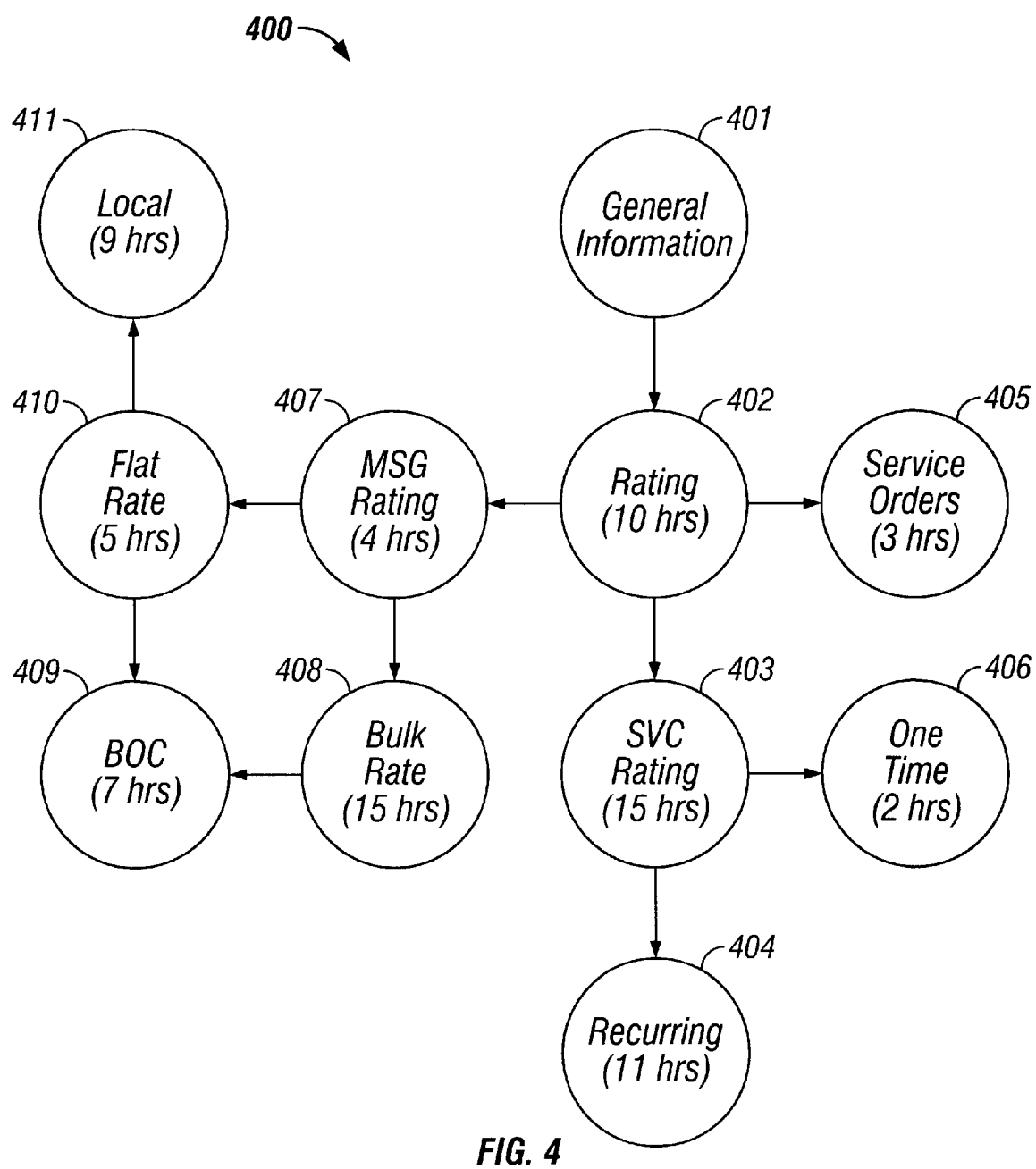
FIG. 4 is a schematic diagram of another example of the present invention, representing a model of how various components of a billing system relate to each other.

Another example of a complex system that can benefit from the Requirements Expert of the present invention is a complex computerized billing system associated with a telephone company. FIG. 4 is a sub-system or component logical model 400 for such a billing system. In FIG. 4, element 401 is used for general information. While this node does not represent a component of the system model, per se, general information is desirable and is representative of generic questions/information. For example, node 401 preferably includes descriptions of proposed changes, or the reason for the proposed change or the requested date of completion. In this case, the arrow from node 401 to node 402 does not reflect an "impact" in the sense of the present invention, but in this instance is used only to illustrate a direction of flow from node-to-node.

Node 402 represents rating, which refers to the rates charged for specific types of telephone calls. Factors affecting a rating might include time of day, originating point, terminating point, etc. Node 403 represents service (abbreviated as "SVC" in FIG. 4) rating, which refers to the type of service used, such as flat rate local service, or measured local service.

Node 404 is for recurring charges which occur on each and every monthly telephone bill. Examples of such recurring charges are for caller ID and voice messaging services. Node 405 represents service orders, which are customer orders for new products and services. Node 406 models one time charges, such as installation charges. Node 407 covers message (abbreviated as "MSG" in FIG. 4) rating, which is directed primarily to how long distance calls are billed.

Node 408 refers to bulk rate services such as WATS lines, etc. Node 409 represents those charges which are specific to the local Bell Operating Company (abbreviated as "BOC" in FIG. 4). Node 410 is concerned with a telephone service which is billed at a flat rate (i.e., which is not dependent on amount of service). Node 411 represents aspects of local telephone calls, as opposed to long distance. In this example, all of the nodes, except node 401, represent segments of an overall computer program that implements the billing system. Thus, in view of this example and the automobile manufacturing example discussed previously, it is evident that the Requirements Expert of the present invention is applicable to both complex mechanical and software systems.

FIGS. 5A and 5B are an exemplary listing of nodes representing the various components of a complex billing system.

FIGS. 6A and 6B illustrate an exemplary listing of the parent-child relationships between the nodes illustrated in FIGS. 5A and 5B. This listing is a typical printout of the Requirements Expert knowledge base 11, if asked to output all nodes and their relationships.

FIGS. 7A through 7E illustrate an exemplary listing of questions that might be associated with selected nodes of FIG. 4. As can be seen from FIGS. 7A–7E, the extent and detail of questions can be designed to suit the particular circumstances. Finally, FIGS. 8A through 8E depict a partial example of an output of the present invention including questions, whether a particular question was answered and a time period associated with completing an action with respect to modifying that aspect of the complex system.

Thus, the Requirements Expert of the present invention is particularly useful in an environment in which complex systems are maintained by a plurality of people. The Requirements Expert stores the knowledge of those plurality of people in a central database and the database can be accessed by a single user. The Requirements Expert thus gives that user the capability to develop a clear list of actions to be taken to complete a project or implement a change to a complex system. In accordance with the present invention, the user is provided with an impact analysis, i.e., which components of the system are impacted by a proposed change, an assurance that all details having to do with a change have been properly addressed, and a clear description of what work or action must be taken and how long that action or work is likely to take.

More particularly, the Requirements Expert of the present invention formalizes and automates a procedure which is typically informal, manual, incomplete and error-prone. Impact analysis, especially in the software field, is typically done by programmers who "just know" and have personal long-term working relationships with each other. Obviously this is a source of mistakes and omissions. Further, it is generally assumed that everyone in an organization understands relevant acronyms and commonly-used terminology. Likewise, estimates of time required for project completion is often an informal and imprecise process. In contrast, the Requirements Expert establishes a formal, automatic, complete review system for a project, thereby substantially minimizing errors. Thus, the Requirements Expert makes the process of maintaining existing software or other complex systems a more defined, repeatable process, so that when changes are implemented and the new product is released there are fewer mistakes and fewer instances in which this new product or system has to be retooled.

The Requirements Expert of the present invention may also be considered to be a requirements generating apparatus for establishing requirements for implementing changes to a system. That is, the Requirements Expert includes a relational database programmed to operate as a network of interconnected nodes, wherein each of the nodes is capable of storing query information related to a distinct component of the system. Also included is a query engine associated with the relational database. The query engine queries a user based on stored query information. Finally, to provide the total time associated with implementing a particular project, a summing circuit is provided that is in communication with the relational database and query engine. The summing circuit sums periods of time associated with specific actions for implementing the changes to the system, wherein the specific actions are determined by responses received by the query engine. The Requirements Expert of the present invention, implemented as a requirements generating apparatus, can be implemented with any general purpose computer system or specially designed computer system having the elements depicted in FIG. 1.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A requirements generating apparatus for establishing requirements for implementing changes to a system, the apparatus comprising:

a relational database programmed to operate as a network of interconnected nodes, each of said nodes being capable of storing query information related to a distinct component of the system;

a query engine associated with said relational database, said query engine being capable of querying a user based on stored query information; and a summing circuit, in communication with said relational database and query engine, being capable of summing periods of time associated with specific actions for implementing the changes to the system, said specific actions being determined by responses received by said query engine.

2. The apparatus of claim 1, wherein said responses received by said query engine are stored and output as a requirements document.

3. The apparatus of claim 1, wherein said relational database is capable of listing all nodes.

4. The apparatus of claim 1, further comprising an acronym query engine and an ambiguous word query engine.

* * * * *